United States Patent
Sunada et al.

(10) Patent No.: US 9,819,017 B2
(45) Date of Patent: Nov. 14, 2017

(54) SEALED BATTERY AND BATTERY JACKET CAN

(71) Applicant: FDK Tottori Co., Ltd., Tottori (JP)

(72) Inventors: Satoshi Sunada, Tottori (JP); Takahide Kobashi, Tottori (JP); Yoshie Fujita, Tottori (JP); Nobuhiro Nishiguchi, Tokyo (JP)

(73) Assignee: FDK Corporation, Tokyo (JP)

( * ) Notice: Subject to any disclaimer, the term of this patent is extended or adjusted under 35 U.S.C. 154(b) by 0 days.

(21) Appl. No.: 14/818,707

(22) Filed: Aug. 5, 2015

(65) Prior Publication Data

US 2016/0043356 A1   Feb. 11, 2016

(30) Foreign Application Priority Data

Aug. 6, 2014 (JP) ................................. 2014-160522

(51) Int. Cl.
    *H01M 4/40* (2006.01)
    *H01M 4/50* (2010.01)
    (Continued)

(52) U.S. Cl.
    CPC ........... *H01M 4/405* (2013.01); *H01M 2/022* (2013.01); *H01M 2/027* (2013.01);
    (Continued)

(58) Field of Classification Search
    CPC .................................. H01M 2/08; H01M 2/022
    See application file for complete search history.

(56) References Cited

U.S. PATENT DOCUMENTS 6,316,128 B1 * 11/2001 Ishio .................... B23K 20/023
                                                       428/644
2002/0081482 A1 * 6/2002 Takada ................ H01M 2/1241
                                                        429/53
(Continued)

FOREIGN PATENT DOCUMENTS

JP          07-037611 A      2/1995
JP       2010-238462 A     10/2010

*Primary Examiner* — Olatunji Godo
(74) *Attorney, Agent, or Firm* — Harness, Dickey & Pierce, P.L.C.

(57) ABSTRACT

There is provided a sealed battery having excellent corrosion resistance and sealing performance. The sealed battery 1 includes a battery jacket can 2 having a bottom and being in a cylindrical or polyhedral shape. The battery jacket can 2 also serves as a collector of one of the electrodes. The battery jacket can 2 has an opening pointing upwards and accommodates active parts (3, 4, 5 and 20). The opening is sealed by a sealing part 10 that includes a flat metal sealing plate 6, a gasket 9 made of an insulator, and a terminal part 7 of the other electrode. In the sealing part, the terminal part is attached to the sealing plate 6 using the gasket 9. The sealing plate has a planar shape that matches a shape of the opening of the battery jacket can. The sealing plate is in a saucer shape whose edge section is bent upwards. An upper end of the edge section of the sealing plate is laser-welded to an upper end of the battery jacket can while the sealing plate being inserted inside the opening of the battery jacket can. The battery jacket can is made of ferritic stainless steel to which Tin (Sn) is added.

4 Claims, 4 Drawing Sheets

(51) Int. Cl.
*H01M 2/02* (2006.01)
*H01M 2/04* (2006.01)
*H01M 6/16* (2006.01)

(52) U.S. Cl.
CPC ....... *H01M 2/0285* (2013.01); *H01M 2/0426* (2013.01); *H01M 2/0486* (2013.01); *H01M 4/50* (2013.01); *H01M 6/16* (2013.01)

(56) References Cited

U.S. PATENT DOCUMENTS

2009/0081545 A1* 3/2009 Zhang .................. H01M 4/505
  429/207
2011/0316487 A1* 12/2011 Nakai .................. H01M 4/485
  320/160

* cited by examiner

SEALED BATTERY AND BATTERY JACKET CAN

CROSS-REFERENCE TO RELATED APPLICATIONS

The present application claims priority from Japanese Patent Application No. 2014-160522 filed on Aug. 6, 2014, which is herein incorporated by reference.

BACKGROUND

Technical Field

The invention relates to a sealed battery and a battery jacket can.

Related Art

In a sealed battery such as a cylindrical alkaline battery or a bobbin-type lithium battery, a battery jacket can serves as a collector of one of the electrodes. The battery jacket can accommodates the active parts inside thereof and its opening is sealed by a sealing part. In such a sealed battery, the battery jacket can constitutes the greatest portion of the total surface area of the battery, and is required to have high durability than the other components of the battery. Specifically, the battery jacket can is required to have corrosion resistance of preventing rusting during long-term storage or under environmental conditions at high temperature and high humidity. In a battery jacket can (hereinafter referred to as a cell can) for a sealed battery, materials containing Ni such as Ni-plated steel sheet or austenitic stainless steel have been employed to improve corrosion resistance.

Whereas a cell can has to have the foregoing corrosion resistance, the cell can has to have good sealing quality so that its opening is certainly sealed by a sealing plate and leakage of active parts which are accommodated inside is prevented for a long period of time. Methods for sealing a cell can include: crimping in which the diameter of the opening of the cell can is reduced and a sealing part is attached to the opening; laser welding; or the like. Materials of the cell can are described in Japanese Unexamined Patent Application Publication No. 2010-238462, etc., and the sealing method is described in Japanese Unexamined Patent Application Publication No. 7-37611, etc.

In conventional sealed batteries, a cell can is made of steel plate containing Ni. A cell can made of, for example, Ni-plated steel cannot achieve enough corrosion resistance. This is because water enters from pin holes, which are produced when a plate material is shaped into a cell can. Austenitic stainless steel does not have deposit, and therefore pin holes are not produced, in principle, in a cell can made of austenitic stainless steel. But, Ni-rich austenitic stainless steel, which is rare metal, is expensive. In such sealed batteries, improvement of the corrosion resistance of cell cans with cost as low as possible is in demand. Material of a cell can is required to have excellent corrosion resistance and to be inexpensive.

The material of a cell can will be discussed for sealing performance. Sealing performance is determined according to a sealing method as well as the material of a cell can, and it is necessary to choose a material suitable for the sealing method. As a sealing method, there are a method by the foregoing crimping and a method by laser welding. In the sealing method by crimping, external force exerted on a cell can during the processing has to be accurately adjusted according to mechanical properties of the material of a cell can (e.g. flexural strength); this is because the opening of the cell can is mechanically deformed and a sealing part fits to the opening. Electrolyte solution will be gradually reduced during long-term storage because of climbing movement of electrolyte (which is called as creeping).

On the other hand, in the sealing method by laser welding, since a sealing part and a cell can are joined to each other by welding, leakage due to the electrolyte creeping will not occur in principle after sealing. Sealing by laser welding is more appropriate in the light of reliability, including corrosion resistance. In the sealing method by laser welding, the electrolyte creeping will however occur at the time of welding by laser beam. Specifically, in a laser welding process, a sealing part is inserted into a cell-can opening before laser beam irradiates the sealing part, and the insertion causes the electrolyte creeping because the edge of the sealing part comes into close contact with the inner surface of the cell can. Thus, if it takes long time to finish sealing by laser welding, welding will be insufficient because electrolyte solution enters into the contact surface between the sealing part and the inner surface of the cell can. It is therefore necessary to finish laser welding for shorter time using high-power laser beam.

Because electrolyte creeping is less likely to occur in a cooled electrolyte solution whose viscosity and surface tension are low, Japanese Unexamined Patent Application Publication No. 7-37611 described the invention in which a cell can filled with cool electrolyte solution is sealed by laser welding. However, this requires a process for cooling electrolyte solution, which results in complexity of the manufacturing process. This also requires energy for cooling electrolyte solution. That is, the invention described in Japanese Unexamined Patent Application Publication No. 7-37611 will increase cost. It is, therefore, necessary for a cell can to be made of a material which can be processed by laser welding for shorter time without increasing the power of laser beam.

SUMMARY

An advantage of the present invention is to provide a cell can which has excellent corrosion resistance at high temperature and high humidity and during long-term storage and which is made of cheap material suitable for laser welding, and a sealed battery including such a cell can.

A primary aspect of the present invention to achieve the above advantage is a sealed battery, including:
  a battery jacket can
    that has a bottom and is in a cylindrical or polyhedral shape,
    that also serves as a collector of one of the electrodes,
    that has an opening pointing upwards, and
    that is made of ferritic stainless steel to which Tin (Sn) is added;
  active parts that are accommodated in the battery jacket can; and
  a sealing part
    that includes a flat metal sealing plate, a gasket made of an insulator, and a terminal part of the other electrode,
    that seals the opening of the battery jacket can, and
    in which the terminal part is attached to the sealing plate using the gasket,
      the sealing plate having a planar shape that matches a shape of the opening of the battery jacket can,
      the sealing plate being in a saucer shape whose edge section is bent upwards,
      an upper end of the edge section of the sealing plate being laser-welded to an upper end of the battery jacket can while the sealing plate being inserted inside the opening of the battery jacket can.

The sealing plate may be made of Sn-added ferritic stainless steel. It is more preferable that a sealed battery according to any one of those described above is a primary battery whose cathode active material is manganese dioxide and whose anode active material is lithium or lithium alloy. The scope of the present invention also includes the battery jacket can of a sealed battery according to any one of those described above, the battery jacket can having a bottom and being in a cylindrical or polyhedral shape, the battery jacket can being made of ferritic stainless steel to which Tin (Sn) is added.

DESCRIPTION OF EXEMPLARY EMBODIMENTS

The embodiment of the invention will be described below with reference to the accompanying drawings. In the description below, the same or similar items will be indicated by the same symbols and duplicate descriptions will be often omitted. In some drawings, symbols unnecessary for the explanation will be omitted.

Embodiment

As a sealed battery of the embodiment according to the present invention, a lithium primary battery is provided. As well known, lithium primary batteries whose cathode active material is manganese dioxide and whose anode active material is lithium or lithium alloy have high energy density. And such lithium primary batteries can discharge for a long period of time, and the voltage drop is small until the end stage of discharge. The lithium primary batteries are therefore widely used in power supplies of devices such as a stationary gas meter, a stationary water meter and the like; that is, the batteries continue to supply power to the devices for a long period of time. Also, lithium primary batteries which have not yet been used can be stored for a long period of time without a large loss of capacity. That is, the lithium primary batteries are often used outdoors and stored for long period. And, lithium primary batteries are required to have higher corrosion resistance than other types of batteries. It goes without saying that the corrosion resistance has to be achieved with a low cost.

Figure 1:
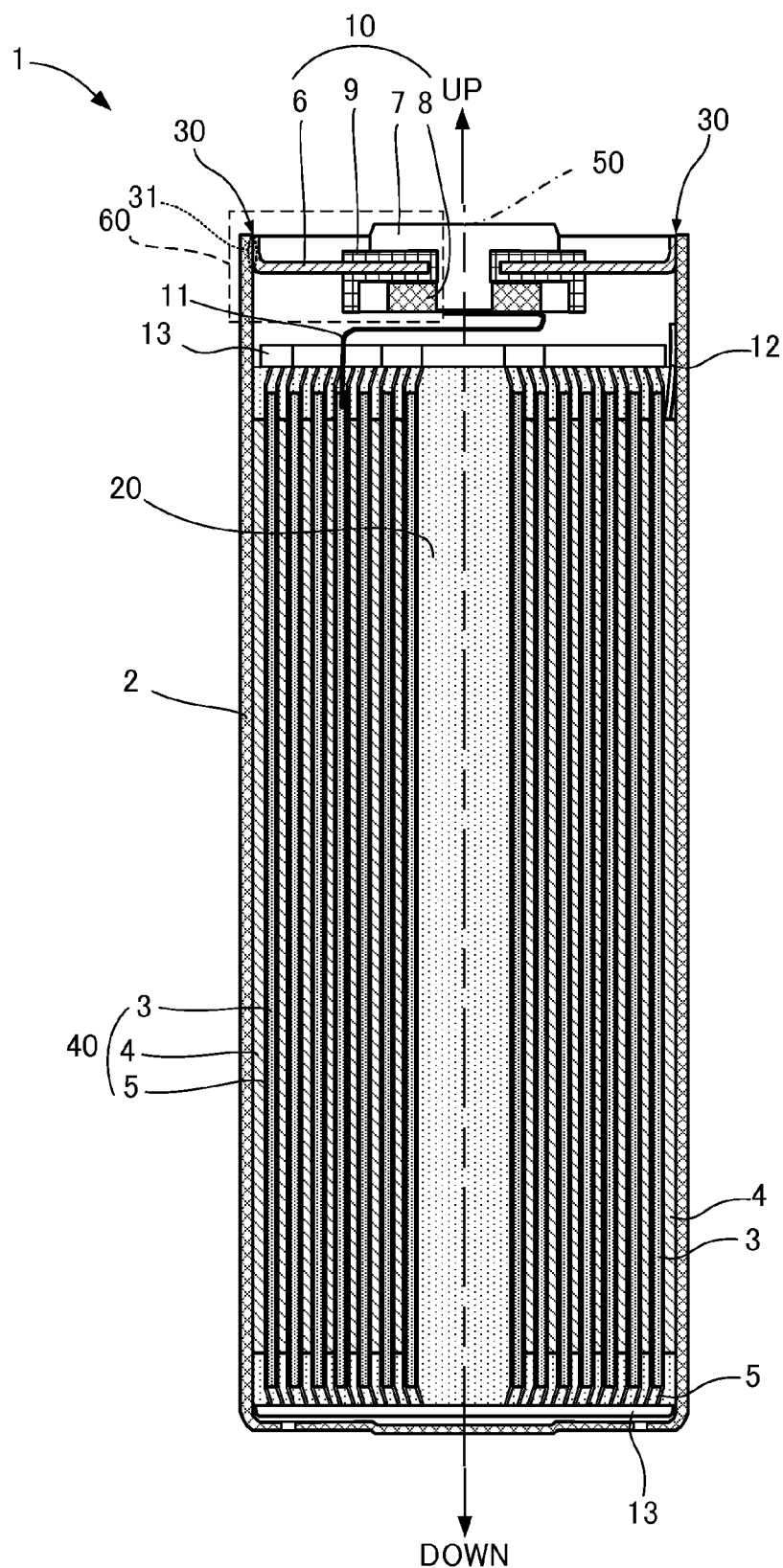
FIG. 1 is a diagram showing the construction of a sealed battery of the embodiment according to the present invention.

FIG. 1 is a diagram showing the overall construction of a sealed battery 1 of the embodiment according to the present invention; a spiral-wound primary lithium battery (hereinafter referred to as the sealed battery 1) in this embodiment. The sealed battery 1 is in a cylindrical shape having an external diameter of 17 mm and a height of 45 mm, and FIG. 1 is a longitudinal sectional view when a direction in which a cylinder axis 50 extends is the up-and-down (vertical) direction. The sealed battery 1 has the following basic construction: a cylindrical metal battery jacket can(hereinafter referred to as a cell can 2) accommodates an active part composed of a positive electrode 3, a negative electrode 4, a separator 5, and an electrolyte solution 20; the cell can 2 has a bottom and serves as an anode current collector; the opening of the cell can 2 is sealed by a sealing part 10 including a metal sealing plate (hereinafter referred to as the sealing plate 6), a positive terminal 7, a metal washer (hereinafter referred to as the washer 8), and a gasket 9 made of insulating resin.

The positive electrode 3 constituting the active parts is made by applying a positive electrode material to stainless steel lath before drying, the positive electrode material being in slurry form. For example, the positive electrode material is a mixture of electrolytic manganese dioxide (EMD: serving as a cathode active material), graphite (serving as electro-conductive substance) and a binder (a fluorine-based binder and the like) in a certain ratio (e.g. EMD: graphite: binder=93 wt %: 3 wt %: 4 wt %). And, the positive electrode material is formed into slurry using pure water.

The negative electrode 4 is lithium metal or lithium alloy in plate form, and lithium-aluminum alloy is used in this embodiment. The negative electrode 4 and the positive electrode 3 constitute the winding structure 40 in which these electrodes are wound together with the separator 5 placed between these electrodes. A winding structure 40 is inserted into the cell can 2. The separator 5 is composed of, for example, microporous polyolefin film. On the upper and lower ends of the winding structure 40, a disc-shaped insulator 13 is placed. This prevents the negative electrode 4 from being in contact with the positive terminal 7, and also prevents the positive electrode 3 from being in contact with the cell can 2 which serves the anode current collector.

The metal sealing plate 6 constituting the sealing part 10 has a disk-like shape having an opening on the center thereof. When the side of the opening end in the cell can 2 is defined as "up", the edge of the disk is bent upwards. At the central opening of the sealing plate 6, the metal positive terminal 7 and the metal washer 8 are caulked with the resin gasket 9 placed between the terminal and the washer. For the material of the sealing plate 6 and the positive terminal 7, Ni-plated steel may be employed as in conventional sealed batteries. When laser beam irradiates the boundary part between the edge of the sealing plate 6 and the upper edge of the cell can 2 (the position indicated by the symbol 30 in the figure), the sealing plate 6 and the cell can 2 are welded together on a contact area 31 in which the sealing plate 6 and the cell can 2 are in contact with each other. The opening of the cell can 2 is thereby sealed, and the cell can 2 is sealed. And, (the lath of) the positive electrode 3 is connected to the lower surface of the positive terminal 7 through a lead tab 11, and the negative electrode 4 is connected to the inner surface of the cell can 2 through a lead tab 12. The sealed cell can 2 is filled with electrolyte solution 20. The solvent of the electrolyte solution 20 is, for example, a well-known three-component non-aqueous solution in which the proportion of propylene carbonate (PC), ethylene carbonate (EC) and 1,2-dimethoxyethane (DME) is the volume ratio of 20 vol %: 20 vol %: 60 vol %. The electrolyte solution 20 may be, for example, a solution in which lithium triflate (LiCF$_3$SO$_3$) is dissolved in this solvent to a concentration of 0.8 mol/l, the lithium triflate serving as a supporting electrolyte.

The configuration and construction of the sealed battery 1 according to the embodiment is the same as a spiral-wound primary lithium battery which is a commercial product. But, in the sealed battery 1 of the embodiment, ferritic stainless steel to which Tin (Sn) of 0.3 wt % is added (hereinafter referred to as Sn-added ferritic stainless steel) is used as a material of the cell can 2. The cell can 2 made of Sn-added ferritic stainless steel has higher corrosion resistance and long-term storage capability, and can reduce processing time of laser welding. The section below describes sealing performance of laser welding and corrosion resistance in the sealed battery 1 according to the embodiment.

Corrosion Resistance

For evaluating the corrosion resistance of the sealed battery 1 according to the embodiment, prepared were samples of the sealed batteries which have the configuration shown in FIG. 1 and whose material of the cell can 2 are different. Specifically, the following two types of samples were prepared: sealed batteries each having a cell can made of Sn-added ferritic stainless steel; and sealed batteries each having a cell can made of Ni-plated steel sheet. For the material of the sealing plate 6 and the positive terminal 7, Ni-plated steel was employed as in conventional sealed batteries. Corrosion resistance test was conducted in which samples were stored at room temperature, at 60° C./90% relative humidity (RH), or at 80° C./90% RH. In 10 days, 30 days, 60 days, and 100 days after the samples were stored, the outer surfaces of the batteries were visually examined about the presence of rust. For each test, ten samples of each type were prepared.

Table 1 below shows the result of the corrosion test.

TABLE 1

| Test | Cell can | The Number of Rusting Samples | | | |
| --- | --- | --- | --- | --- | --- |
| | | 10 days | 30 days | 60 days | 100 days |
| Room temperature | Ni-plated steel sheet | 0/10 | 2/10 | 3/10 | 5/10 |
| | Sn-added | 0/10 | 0/10 | 0/10 | 0/10 |
| 60° C. 90% RH | Ni-plated steel sheet | 2/10 | 5/10 | 7/10 | 8/10 |
| | Sn-added | 0/10 | 0/10 | 0/10 | 0/10 |
| 80° C. 90% RH | Ni-plated steel sheet | 4/10 | 8/10 | 10/10 | 10/10 |
| | Sn-added | 0/10 | 0/10 | 1/10 | 1/10 |

As shown in Table 1, of 10 samples whose cell cans were made of Ni-plated steel sheet, two samples rusted in 30 days after being stored at room temperature, and half of them rusted in 100 days. At temperature of 60° C. and relative humidity (RH) of 90%, two of them rusted in 10 days after being stored, and eight of them rusted in 100 days. At temperature of 80° C. and relative humidity (RH) of 90%, four of them rusted in 10 days, and all of them rusted in 100 days. As shown in the test result, whereas samples whose cell cans are made of Ni-plated steel sheet maintain corrosion resistance at room temperature for a short period, rust occurs under severe environmental conditions or during long-term storage; the rust may be caused by pin holes which are produced during shaping of the cell can.

On the other hand, all of the samples whose cell cans were made of Sn-added ferritic stainless steel had not rusted yet in 100 days at room temperature, and also at temperature of 60° C. and relative humidity (RH) of 90%. Under extremely severe environmental conditions at temperature of 80° C. and relative humidity (RH) of 90%, one of the ten samples eventually rusted. This confirmed that a sealed battery whose cell can is made of Sn-added ferritic stainless steel has extremely excellent corrosion resistance. Since Sn-added ferritic stainless steel does not contain Ni, inexpensive sealed batteries can be realized.

Sealing Performance

Figure 2:
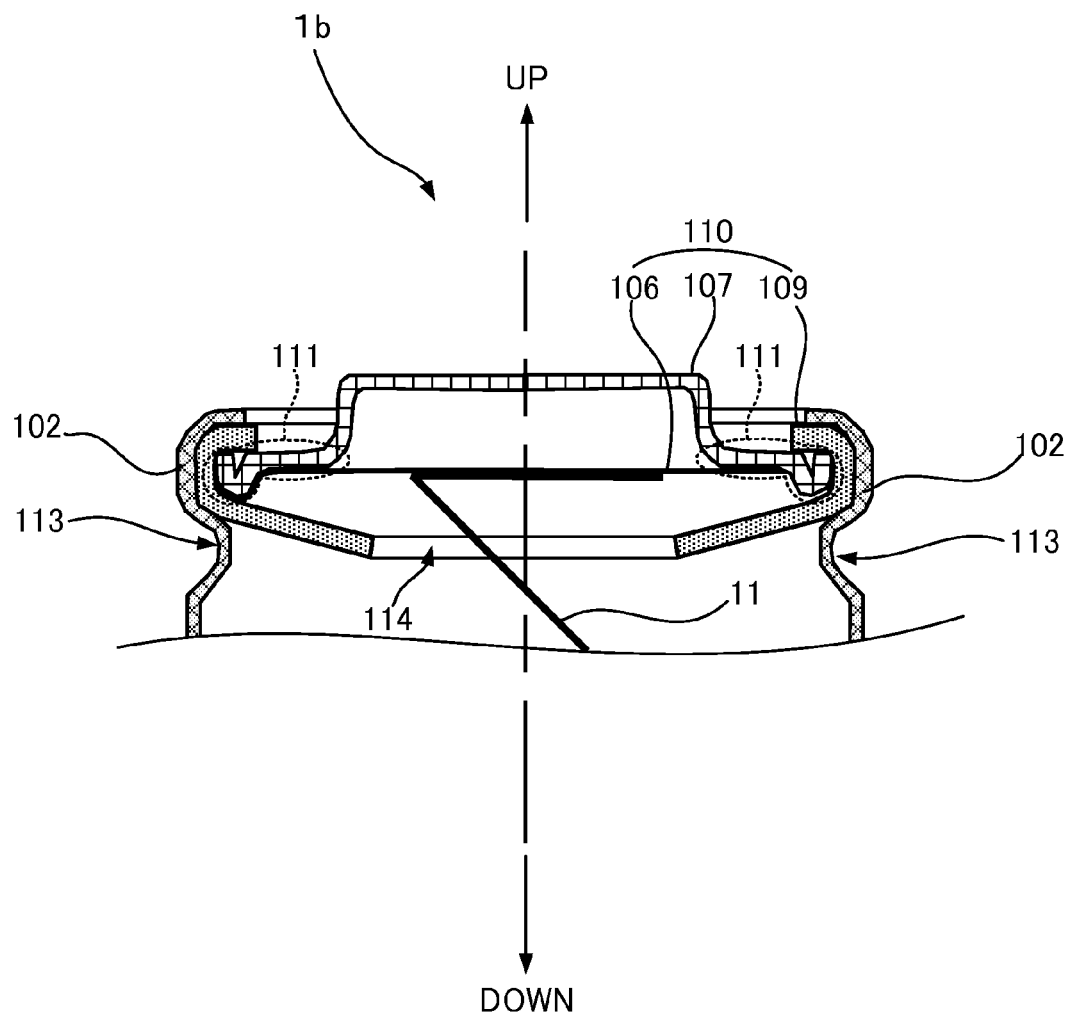
FIG. 2 is an enlarged view of a part of a sealed battery sealed by crimping.

As for sealed batteries according to the above embodiment, the sealing performance of laser welding is evaluated. For the evaluation, the following samples were prepared in order to confirm an advantage of sealing by laser welding: a sealed battery whose cell can opening is sealed by crimping; and a sealed battery whose cell can opening is sealed by laser welding in the same way as the sealed battery 1 shown in FIG. 1. FIG. 2 shows a sealed battery 1b sealed by crimping. In FIG. 2, the part relating to the sealing structure of a cell can 102 is enlarged. As shown in FIG. 2, a sealing part 110 includes: a terminal plate (in this embodiment, a positive terminal plate) 107; a sealing plate 106; and a gasket 109. The positive terminal plate 107 is made of metal. If the side toward the opening of the cell can 102 is defined as "up", the positive terminal plate 107 has a saucer-like shape and the bottom of plate 107 is located upside. And, the positive terminal plate 107 includes a flange 111 formed on its edge. Below the positive terminal plate 107, the sealing plate 106, which is a metal disk, is placed. Procedures for sealing the cell can 102 by crimping will be described below.

On the opening side of the cell can 102, a beading section 113 is formed. The gasket 109 which has not been sealed yet is in circular cup shape whose opening is located upside, and the gasket 109 has a hole 114 on its bottom which a positive lead tab 11 passes through. The positive electrode lead tab 11 is brought out of the winding structure accommodated in the cell can 102, and the lead tab 11 is welded to the lower surface of the sealing plate 106. Then, into the cell can 102, non-aqueous electrolyte solution is introduced. Subsequently, the resin gasket 109 is inserted inside the opening of the cell can 102, and the gasket 109 is arranged onto the foregoing beading section 113. Inside the gasket 109 attached to the inside of the cell can 102 in the foregoing manner, the sealing plate 106 and the positive terminal plate 107 are stacked. The opening of the cell can 102 is caulked inwards. The sealing part 110 is thereby fitted to the opening end of the cell can 102 and the cell can 102 is sealed.

Next, for comparing the hermeticity of the batteries having different sealing structures, the sealed batteries 1 shown in FIG. 1 and the sealed batteries 1b shown in FIG. 2 were prepared as samples. Hermeticity test was conducted in which the samples were left under environmental conditions at temperature of 80° C. and relative humidity (RH) of 90%, and the relation between the number of storage days and the change in mass was observed. All samples have the same configuration and structure except for the sealing structure. The cell cans 2 and 102 were made of Ni-plated steel.

Table 2 shows the result of the hermeticity test.

TABLE 2

| Test | Sealing | Change in Mass | | | |
| --- | --- | --- | --- | --- | --- |
| | | 10 days | 30 days | 60 days | 100 days |
| 80° C. 90% RH | Crimping | −0.005 g | −0.011 g | −0.018 g | −0.030 g |
| | Laser welding | −0.004 g | −0.008 g | −0.014 g | −0.021 g |

As shown in Table 2, the masses of the samples gradually decreased as storage days increased. This confirmed that change in the masses of the samples sealed by laser welding is small compared to the samples sealed by crimping. That is, this confirms that the sealing structure by laser welding is superior in hermeticity to the sealing structure by crimping. For evaluating the sealing performance of the foregoing embodiment, the sealed batteries 1 which have the configuration shown in FIG. 1 and whose cell cans 2 are made of different material were made as samples. Specifically, the following two types of samples were prepared: samples in which the cell can 2 made of Sn-added ferritic stainless steel is sealed by laser welding with the sealing plate 6 made of Ni-plated steel; and samples in which the cell can 2 made of Ni-plated steel is sealed by laser welding with the sealing plate 6 made of Ni-plated steel.

Figure 3:
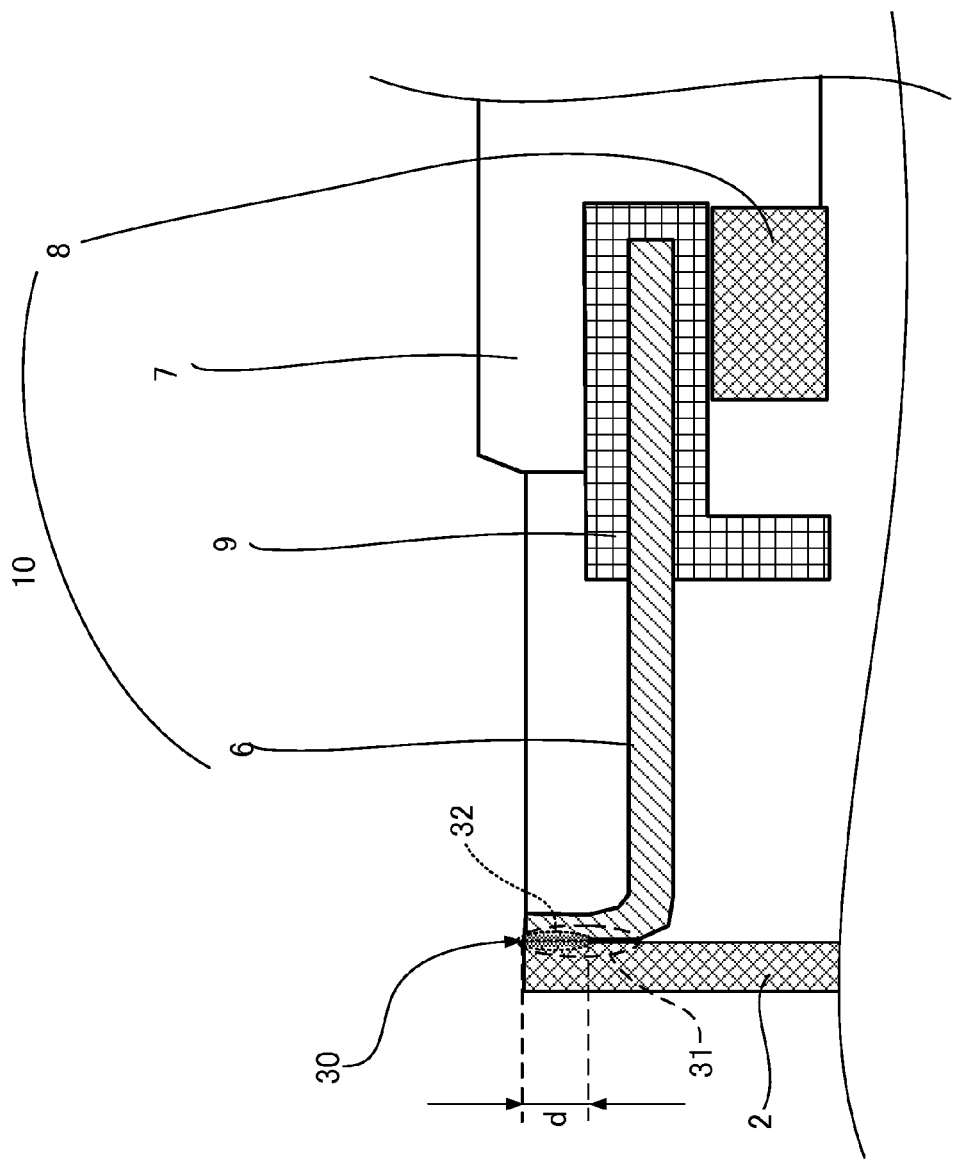
FIG. 3 is a diagram illustrating how to evaluate the sealing performance realized by laser welding.

FIG. 3 is a schematic diagram showing how to evaluate sealing performance depending on the material of the cell can 2, and is an enlarged view of the rectangular area 60 indicated by a dashed line in FIG. 1. As shown in FIG. 3, the relationship between the weld-joint penetration d and the weld-joint speed V were examined: the weld-joint penetration d is the vertical width of an area, within a contact area 31 of the sealing plate 6 and the cell can 2, where the sealing plate 6 and the cell can 2 are joined by welding (hereinafter referred to as a weld-joint area 32); and the weld-joint speed is a speed of welding in which laser welding joint is performed until the weld-joint penetration d. Specifically, as for the samples (hereinafter referred to as a comparative example) whose cell cans 2 made of Ni-plated steel were sealed by laser welding joint, which were used for the foregoing hermeticity evaluation, the weld penetration d of the comparative example is defined as a relative value of 100. In the comparative example, the reciprocal of the time until the weld penetration d becomes 100 is defined as welding speed V of 100 (relative value). That is, in the comparative example, when welding speed V=100, the weld penetration d=100. The weld penetration d can be an indicator of weld strength, and the welding speed can be an indicator of length of processing time relating to laser welding. The relation between the welding speed V and the weld penetration d of the cell can 2 made of Sn-added ferritic stainless steel which is sealed by laser welding were examined.

Figure 4:
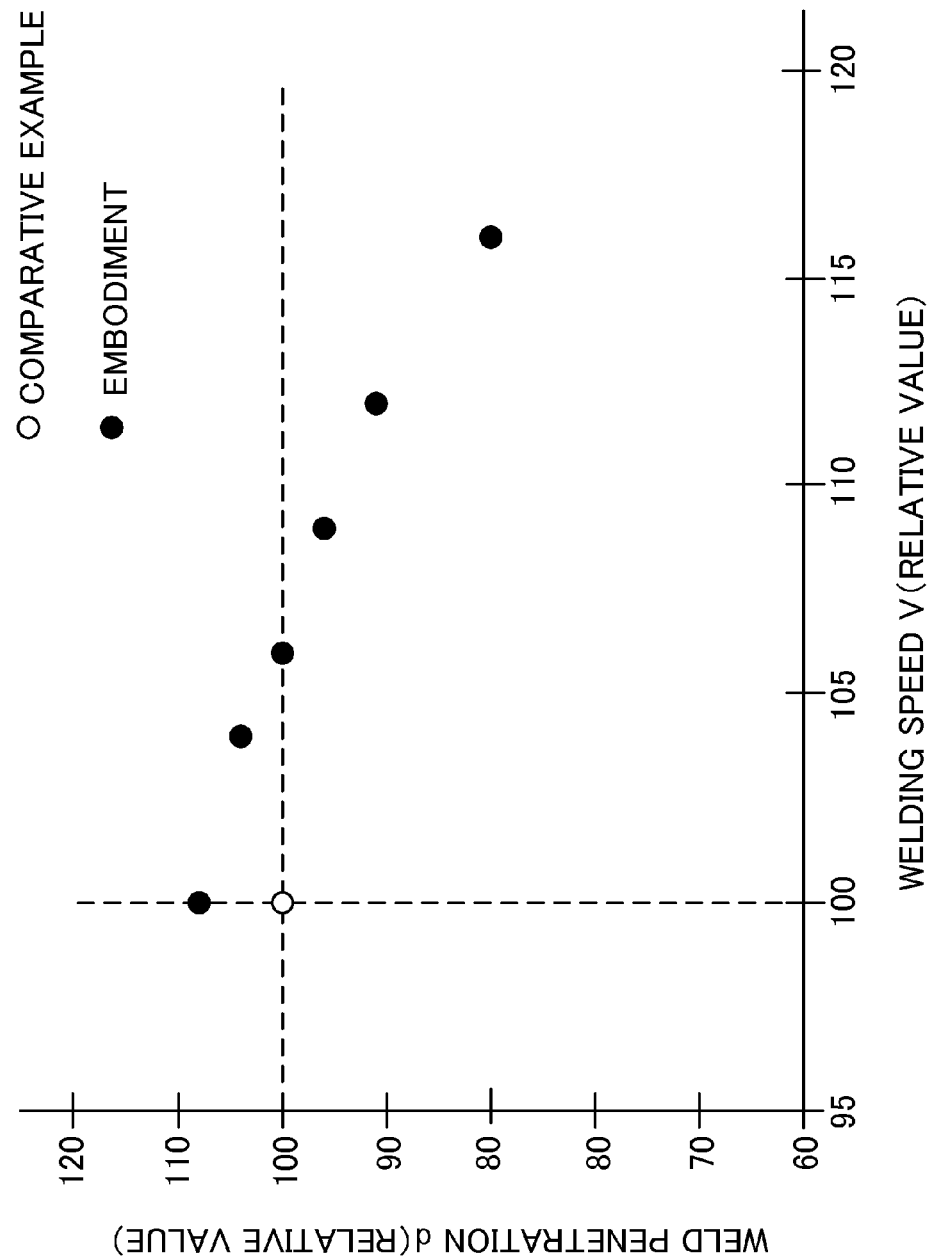
FIG. 4 is a graph showing the sealing performance in the embodiment.

Table 3 shows the evaluation result of the sealing performance of the embodiment. FIG. 4 shows a graph of the result.

TABLE 3

| | Relative value (Ni-plated steel: 100) | | | | |
|---|---|---|---|---|---|
| Welding speed V | 100 | 104 | 106 | 108 | 112 | 116 |
| Weld penetration d | 108 | 104 | 100 | 96 | 91 | 80 |

As shown in Table 3 and FIG. 4, in the sealed battery 1 according to the embodiment, the weld penetration d=108 if the welding speed V=100. It was found that greater weld strength can be achieved in the same welding time. In other words, the weld penetration d can become 100 in a shorter period than in the comparative example. That is, the sealed battery 1 according to the embodiment, low-power laser beam in the laser welding process can achieve practical weld strength in the same processing time as in a conventional manner. Also, laser beam whose power is the same as in a conventional manner can achieve practical weld strength in shorter time. This makes it possible to reduce the cost for the laser welding process, and, as a result thereof, the sealed battery 1 can be more inexpensive. It goes without saying that making the sealing plate 6 of Sn-added ferritic stainless steel can further increase the welding speed.

Other Embodiments

As a sealed battery of the embodiment according to the present invention, a spiral-wound primary lithium battery having a cylindrical cell can is provided. However, a battery whose cell can is in a prismatic or polyhedral shape or the like may be employed as a sealed battery of the embodiment according to the present invention. Of course, the sealed battery is not limited to a lithium primary battery. A sealed battery may be an alkaline dry battery, a manganese dry battery or the like, and may also be a secondary battery. It is sufficient that a battery includes the following cell can: the cell can has a bottom and is in a cylindrical or prismatic or polyhedral shape; the cell can also serves as a collector of one of the electrodes; the cell can is made of Sn-added ferritic stainless steel; and the opening of the cell can is sealed.

What is claimed is:

1. A sealed battery, comprising:
   a battery jacket can
      that has a bottom and is in a cylindrical or polyhedral shape,
      that also a current collector of a first one of two electrodes,
      that has an opening pointing upwards and defines an upper end, and
      that is made of ferritic stainless steel to which Tin (Sn) is added;
   an active parts that are accommodated in the battery jacket can; and
   a sealing part
      that includes a metal sealing plate, a gasket made of an insulator, and a terminal part of the other electrode,
      that seals the opening of the battery jacket can, and
      in which the terminal part is attached to the sealing plate using the gasket,
         the sealing plate being in a saucer shape whose edge section is bent upwards to define an upper edge and conforms to the shape of the opening of the battery jacket can at the upper end of the battery jacket can,
         the upper end of the edge section of the sealing plate being laser-welded to the upper end of the battery jacket can with the sealing plate being disposed inside the opening of the battery jacket can.

2. A sealed battery according to claim 1, wherein the sealing plate is made of Sn-added ferritic stainless steel.

3. A sealed battery according to claim 1, wherein the sealed battery is a primary battery whose cathode active material is manganese dioxide and whose anode active material is lithium or lithium alloy.

4. A battery jacket can included in a sealed battery according to claim 1, the battery jacket can having a bottom and being in a cylindrical or polyhedral shape, wherein the battery jacket can is made of Tin (Sn)-added ferritic stainless steel.

* * * * *

UNITED STATES PATENT AND TRADEMARK OFFICE
CERTIFICATE OF CORRECTION

PATENT NO. : 9,819,017 B2
APPLICATION NO. : 14/818707
DATED : November 14, 2017
INVENTOR(S) : Satoshi Sunada et al.

It is certified that error appears in the above-identified patent and that said Letters Patent is hereby corrected as shown below:

In the Claims

Column 8,
Line 24 (Claim 1), after "that" insert --is--.
Line 30 (Claim 1), "parts that are" should be --part that is--.
Line 34 (Claim 1), "the other electrode," should be --a second one of the two electrodes,--.
Line 38 (Claim 1), "being in" should be --having--.
Line 47 (Claim 2), "A" should be --The--.
Line 50 (Claim 3), "A" should be --The--.
Line 54 (Claim 4), "A" should be --The--.

Signed and Sealed this
Thirteenth Day of March, 2018

Andrei Iancu
*Director of the United States Patent and Trademark Office*